United States Patent
Mannherz et al.

(10) Patent No.: US 10,919,530 B2
(45) Date of Patent: Feb. 16, 2021

(54) METHOD FOR DECELERATING A VEHICLE

(71) Applicant: Robert Bosch GmbH, Stuttgart (DE)

(72) Inventors: Edith Mannherz, Weinsberg (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 15/747,594

(22) PCT Filed: May 30, 2016

(86) PCT No.: PCT/EP2016/062127
§ 371 (c)(1),
(2) Date: Jan. 25, 2018

(87) PCT Pub. No.: WO2017/016705
PCT Pub. Date: Feb. 2, 2017

(65) Prior Publication Data
US 2018/0215384 A1    Aug. 2, 2018

(30) Foreign Application Priority Data
Jul. 27, 2015 (DE) .......................... 10 2015 214 117

(51) Int. Cl.
*B60L 9/00* (2019.01)
*G05D 1/00* (2006.01)
(Continued)

(52) U.S. Cl.
CPC ....... *B60W 30/18109* (2013.01); *B60T 13/10* (2013.01); *B60T 13/74* (2013.01);
(Continued)

(58) Field of Classification Search
CPC .......... B60T 13/10; B60T 13/74; B60T 17/18; B60W 10/06; B60W 10/08; B60W 10/10;
(Continued)

(56) References Cited

U.S. PATENT DOCUMENTS 6,283,239 B1 * 9/2001 Tsukamoto .............. B60K 6/48
180/65.25
6,935,450 B1 * 8/2005 Tsuzuki ................. H02K 7/006
180/65.26
(Continued)

FOREIGN PATENT DOCUMENTS

CN      1751923 A    3/2006
CN      1989034 A    6/2006
(Continued)

OTHER PUBLICATIONS

International Search Report corresponding to PCT Application No. PCT/EP2016/062127, dated Oct. 17, 2016 (German and English language document) (5 pages).

*Primary Examiner* — Harry Y Oh
(74) *Attorney, Agent, or Firm* — Maginot, Moore & Beck LLP

(57) ABSTRACT

A method for decelerating a vehicle includes actuating an electric brake motor of an electromechanical braking mechanism in an event of a failure of a hydraulic vehicle brake to produce a braking force in an event of a failure of the hydraulic vehicle brake. The method further includes producing a decelerating torque in the drive train of the vehicle in the event of the failure of the hydraulic vehicle brake. The vehicle includes a brake system. The brake system has the hydraulic vehicle brake and the electromechanical braking mechanism with the electric brake motor.

12 Claims, 4 Drawing Sheets

(51) Int. Cl.
| | |
|---|---|
| *G05D 11/00* | (2006.01) |
| *G06F 17/00* | (2019.01) |
| *B60W 30/18* | (2012.01) |
| *B60T 13/10* | (2006.01) |
| *B60T 13/74* | (2006.01) |
| *B60W 10/06* | (2006.01) |
| *B60W 10/08* | (2006.01) |
| *B60W 10/10* | (2012.01) |
| *B60W 10/14* | (2012.01) |
| *B60W 10/192* | (2012.01) |
| *B60W 20/50* | (2016.01) |
| *B60T 17/18* | (2006.01) |

(52) U.S. Cl.
CPC ............ *B60W 10/06* (2013.01); *B60W 10/08* (2013.01); *B60W 10/10* (2013.01); *B60W 10/14* (2013.01); *B60W 10/192* (2013.01); *B60W 20/50* (2013.01); *B60T 17/18* (2013.01); *B60W 2300/18* (2013.01); *B60W 2510/182* (2013.01); *B60W 2556/00* (2020.02); *B60W 2710/105* (2013.01); *B60W 2710/18* (2013.01); *B60W 2720/106* (2013.01); *Y10S 903/93* (2013.01)

(58) Field of Classification Search
CPC .... B60W 10/14; B60W 10/192; B60W 20/50; B60W 2300/18; B60W 2510/182; B60W 2600/00; B60W 2710/105; B60W 2710/18; B60W 2720/106; B60W 30/18109; Y10S 903/93
See application file for complete search history.

(56) References Cited

U.S. PATENT DOCUMENTS

| | | | | |
|---|---|---|---|---|
| 2002/0061802 | A1* | 5/2002 | Chung | B60K 6/365 477/3 |
| 2007/0278856 | A1* | 12/2007 | Craig | B60T 13/588 303/122.09 |
| 2008/0164753 | A1* | 7/2008 | Crombez | B60T 1/10 303/114.3 |
| 2009/0071733 | A1* | 3/2009 | Duan | B60K 6/48 180/65.21 |
| 2010/0147637 | A1* | 6/2010 | Kim | F16D 65/18 188/162 |
| 2010/0217488 | A1 | 8/2010 | Nijakowski et al. | |
| 2012/0277966 | A1* | 11/2012 | Herges | B60T 8/175 701/74 |
| 2014/0345986 | A1* | 11/2014 | Foitzik | B60T 17/221 188/106 P |
| 2016/0152144 | A1* | 6/2016 | Choi | B60W 30/18136 701/70 |
| 2016/0167663 | A1* | 6/2016 | Sutton | B60K 17/3467 701/54 |

FOREIGN PATENT DOCUMENTS

| | | |
|---|---|---|
| CN | 101092135 A | 12/2007 |
| CN | 102233871 A | 11/2011 |
| DE | 10 2006 048 910 A1 | 4/2008 |
| DE | 10 2010 028 252 A1 | 10/2011 |
| DE | 10 2012 025 291 A1 | 6/2014 |
| DE | 10 2012 217 704 A1 | 6/2014 |
| JP | 6-8739 A | 1/1994 |
| JP | H08-58567 A | 3/1996 |
| JP | 2001-140665 A | 5/2001 |
| JP | 2003-284202 A | 10/2003 |
| JP | 2006-527342 A | 11/2006 |
| JP | 2007-60761 A | 3/2007 |
| JP | 2007-112391 A | 5/2007 |
| JP | 2008-507443 A | 3/2008 |
| JP | 2009-166656 A | 7/2009 |
| JP | 2011-116237 A | 6/2011 |
| JP | 2012-81917 A | 4/2012 |
| JP | 2013-71521 A | 4/2013 |
| JP | 2013-95258 A | 5/2013 |
| JP | 2015-509455 A | 3/2015 |
| JP | 2015-123767 A | 7/2015 |
| JP | 2016-68940 A | 5/2016 |
| WO | 99/38738 A1 | 8/1999 |
| WO | 2012/079802 A2 | 6/2012 |
| WO | 2013/120563 A1 | 8/2013 |

\* cited by examiner

METHOD FOR DECELERATING A VEHICLE

This application is a 35 U.S.C. § 371 National Stage Application of PCT/EP2016/062127, filed on May 30, 2016, which claims the benefit of priority to Serial No. DE 10 2015 214 117.9, filed on Jul. 27, 2015 in Germany, the disclosures of which are incorporated herein by reference in their entirety.

The disclosure concerns a method for decelerating a vehicle that is equipped with a brake system with a hydraulic vehicle brake and moreover with an electromechanical braking mechanism with an electric brake motor.

BACKGROUND

In DE 10 2006 048 910 A1, a parking assistance system for a vehicle is described that assists the driver during a parking process. With such parking assistance systems, the surroundings of the vehicle are sensed with sensors and the vehicle is automatically decelerated if it is approaching another object, such as for example a parking vehicle, too rapidly. The deceleration process is usually carried out by means of the service brake system of the vehicle, which is as a rule a hydraulic vehicle brake.

According to DE 10 2006 048 910 A1, during a parking process the function of the service brake system is monitored and, in the event of a detected fault, instead of the service brake system either an automatic parking brake is actuated or the vehicle is decelerated by means of an automatic transmission. The automatic parking brake comprises an electric motor, by means of which a brake piston is forced against a brake disk. In the event of engagement of the automatic transmission, the parking position is selected to generate a braking force.

SUMMARY

The method according to the disclosure concerns the deceleration of a vehicle that is fitted with a brake system that on the one hand comprises a hydraulic vehicle brake and on the other hand comprises an electromechanical braking mechanism with an electric brake motor. The electromechanical braking mechanism with a brake motor is usually used as a parking brake or as a holding brake in order to produce a clamping force that holds the vehicle at a standstill. During operation of the electric brake motor, the rotational movement of the rotor of the brake motor is transferred into an axial control movement of a spindle, by means of which a brake piston that carries a brake lining is pressed axially against a brake disk. The brake piston is preferably the brake piston of the hydraulic vehicle brake that is applied against the brake disk by the hydraulic brake pressure.

The electromechanical braking mechanism with the electric brake motor is preferably only used in the low speed range, which is typical for parking processes. In principle, however, it could also be used at higher speeds and/or independently of parking processes.

With the method for decelerating the vehicle, in the case in which the hydraulic vehicle brake has partly or completely failed and the vehicle can thus not be decelerated or cannot be fully decelerated by means of the hydraulic vehicle brake, the electric brake motor of the electromechanical braking mechanism is operated to produce a braking force. In addition, a decelerating torque is produced in the drive train of the vehicle, so that in total the vehicle is not only braked by means of the electromechanical braking mechanism, but also by means of the decelerating torque in the drive train. The drive train in the vehicle comprises at least one drive motor and a gearbox for transmitting the drive movement of the drive motor to the wheels of the vehicle. The procedure with the decelerating torque in the drive train has the advantage that in total a greater braking force is available and accordingly the vehicle can be decelerated in a shorter time and may be able to be brought to a standstill.

The electromechanical braking mechanism must usually first overcome free travel before the brake lining on the brake piston comes into contact with the brake disk and a braking force can be built up. During the free travel, no braking force is available in the electromechanical braking mechanism. In this phase however, a decelerating torque can already be produced by means of the drive train, so that the period of time in which no deceleration is carried out can be significantly reduced, possibly reduced to zero. Usually with the method according to the disclosure, in the event of a failure of the hydraulic vehicle brake initially a decelerating torque is generated by means of an intervention into in the drive train and then a braking force is produced by means of the electromechanical braking mechanism. In this case, it can be advantageous to also maintain the decelerating torque of the drive train beyond the point in time at which a braking force is provided in the electromechanical braking mechanism. Embodiments are also possible, however, with which the decelerating torque of the drive train ends once a sufficiently high braking force is available by means of the electromechanical braking mechanism.

The method is preferably carried out in the parking mode of the vehicle and is part of a parking assistance system, with which the vehicle can be parked and/or unparked in the parking mode. The parking mode is in particular only carried out below a speed limit. The parking assistance system comprises a sensor arrangement in the vehicle, by means of which the distance from obstacles in the surroundings, such as for example parked vehicles, is measured, and a regulating or control unit, in which the sensor data is processed and final control signals for actuating the electromechanical braking mechanism are produced.

It is also possible to carry out the method for automatic deceleration independently of the parking mode, but preferably below a speed limit. The method for decelerating may also be carried out independently of a speed limit.

According to a further advantageous embodiment, following the failure of the hydraulic vehicle brake a clamping or braking process is first initiated in the electromechanical braking mechanism and only then is the drive train adjusted so that a decelerating torque is produced. This ensures that the free travel in the electric brake motor is overcome in the shortest possible time and a clamping force can be produced in the electromechanical braking mechanism. However, it is also possible to carry out the actuation of the electromechanical braking mechanism and the adjustment of the drive train at the same time or to first adjust the drive train to produce a decelerating torque and then to actuate the electromechanical braking mechanism.

According to a further advantageous embodiment concerning a vehicle with automatic transmission, the lowest possible gear is selected in the automatic transmission, which is part of the drive train. The lowest possible gear is speed-dependent, wherein the lowest possible gear is the first gear as a rule when carrying out the method in the parking mode. At higher speeds, a higher gear than the lowest possible gear may be engaged. The lowest possible gear ensures that a maximum possible engine drag torque is acting as the decelerating torque.

As the drive motor forming part of the drive train, both combustion engines and electric motors are considered, which are used either as the sole drive source or, in the case of a hybrid drive, in combination. If there is a combustion engine in the drive train, the same is turned off for decelerating the vehicle according to a further advantageous embodiment. This ensures that the maximum possible engine drag torque can be used for decelerating the vehicle.

In the case of one or more electric motors in the drive train, which are either present alone or in addition to a combustion engine, said electric motor(s) is/are advantageously switched to the generator mode for decelerating the vehicle. A motorized braking torque is thereby produced in the electric motor that decelerates the vehicle; in addition, the vehicle battery is charged.

According to a further advantageous embodiment, at least one electric motor in the drive train is accelerated against the direction of travel. The vehicle moves against the direction of action of the electric drive motor, whereby a decelerating torque is produced.

According to a further advantageous embodiment concerning a vehicle with all-wheel drive, a central differential is locked to the front axle and the rear axle, so that the front axle and the rear axle are kinematically coupled and rotate together and a braking torque acts on all wheels. With all-wheel drive vehicles, an increased braking torque can be transmitted thereby.

The different steps of the method for decelerating the vehicle are carried out in a regulating or control unit in the vehicle, in which final control signals for actuating the adjustable components of both the brake system and the drive train are produced.

BRIEF DESCRIPTION OF THE DRAWINGS

Further advantages and advantageous embodiments are to be found in the further claims, the description of the figures and the drawings. In the figures:

DETAILED DESCRIPTION

Figure 1:
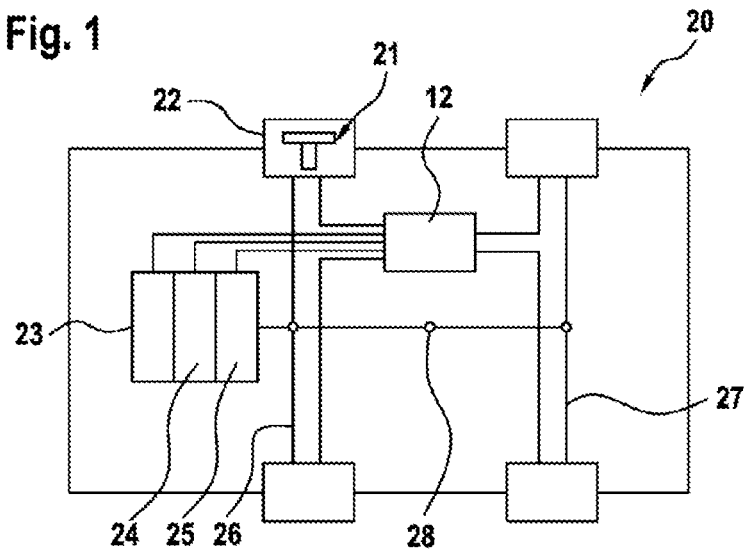
FIG. 1 shows an all-wheel drive vehicle in a schematic representation.

FIG. 1 shows an all-wheel drive vehicle 20 with hydraulic vehicle brakes 21 on each vehicle wheel 22. The drive train of the vehicle 20 is formed by a combustion engine 23 and an automatic transmission 24 connected downstream thereof.

The vehicle 20 can comprise a hybrid drive with an electric drive motor 25 that is joined by a flange to the automatic transmission 24. The drive movement of the combustion engine 23 and possibly of the electric drive motor 25 is transmitted to the front axle 26 of the vehicle and via a central differential 28 to the rear axle 27.

The adjustable components of the vehicle 20, in particular the hydraulic vehicle brake 21, the components of the drive train with the combustion engine 23, the automatic transmission 24 and optionally the electric drive motor 25 and the central differential 28 are adjusted by means of final control signals of a regulating or control unit 12.

Figure 2:
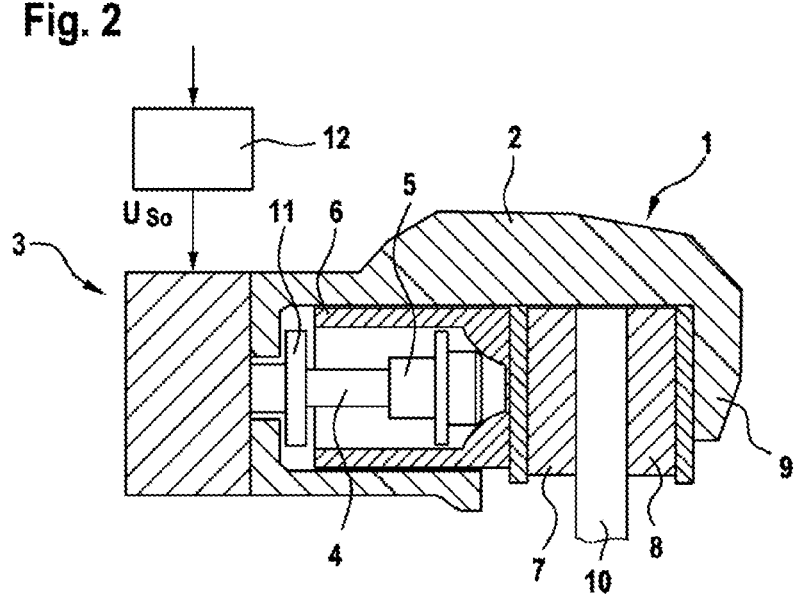
FIG. 2 shows a section through an electromechanical holding brake for a vehicle, with which the clamping force is produced by means of an electric brake motor.

The vehicle 20 is further fitted with an electromechanical braking mechanism with an electric brake motor, which is used as a parking or holding brake for producing a clamping force that holds the vehicle at a standstill. Such an electromechanical braking mechanism 1 is represented in FIG. 2.

The electromechanical braking mechanism 1 comprises a brake caliper 2 with a claw 9 that overlaps a brake disk 10. As a final control element, the holding brake 1 comprises a d.c. electric motor as a brake motor 3, the rotor shaft of which rotationally drives a spindle 4 on which a spindle nut 5 is rotatably supported. During rotation of the spindle 4, the spindle nut 5 is displaced axially. The spindle nut 5 moves within a brake piston 6 carrying a brake lining 7 that is pressed by the brake piston 6 against the brake disk 10. On the opposite side of the brake disk 10 there is a further brake lining 8 that is held positionally fixedly on the claw 9.

During a rotary movement of the spindle 4, the spindle nut 5 can move axially forwards towards the brake disk 10 within the brake piston 6 or during an opposite rotary movement the spindle 4 can move axially rearwards until reaching a stop 11. To produce a clamping force, the spindle nut 5 acts on the inner rear face of the brake piston 6, whereby the brake piston 6, which is axially movably mounted in the electromechanical braking mechanism 1, is pressed with the brake lining 7 against the facing end surface of the brake disk 10.

The brake motor 3 is also actuated by the regulating or control unit 12 that is installed in the vehicle. The regulating or control unit 12 provides as an output a supply voltage $U_{so}$ that is applied to the electric brake motor 3.

The holding brake and the hydraulic vehicle brake 21 both act on the brake piston 6. During actuation of the hydraulic vehicle brake 21, the rear of the brake piston 6 facing the brake motor is subjected to hydraulic fluid under pressure.

Figure 3:
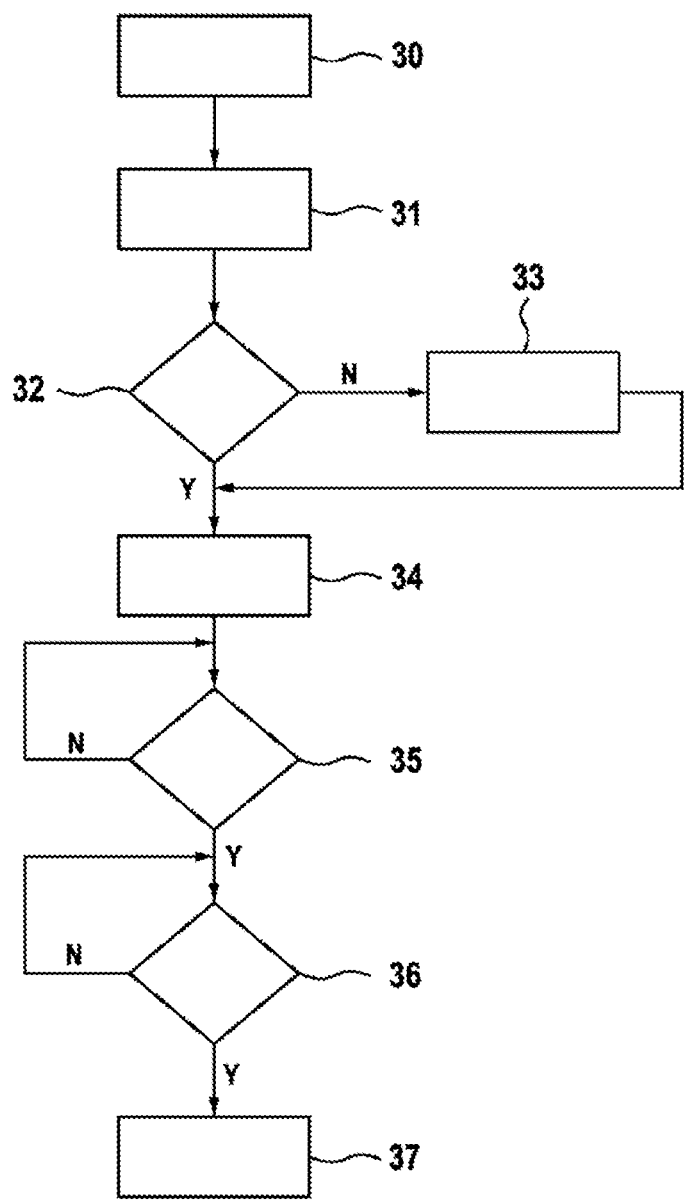
FIG. 3 shows a process schema with steps of the method for decelerating the vehicle in the parking mode in the event of a failure of the hydraulic vehicle brake, shown for a vehicle with front or rear drive.

In FIG. 3, a process schema for decelerating a vehicle in the parking mode is represented for the case in which the hydraulic vehicle brake fails during a parking process, which may be at least partly carried out in an automated manner. The vehicle comprises as a drive a combustion engine to which an automatic transmission is coupled. In the vehicle, only either the rear axle or the front axle is driven.

First, in the first step 30 of the method the failure of the hydraulic vehicle brake is detected. In order to still be able to decelerate the vehicle without an accident, in the next step 31 of the method the electromechanical braking mechanism is started, by means of which a clamping force that decelerates the vehicle to a standstill is produced electromechanically.

In addition, by means of the drive train of the vehicle a decelerating torque is produced to shorten the braking process. For this purpose, in the next step 32 of the method a check is made as to whether the setting of the automatic gearbox is in the drive position. If this is not the case, the no branch ("N") is then followed to the step 33 of the method, in which the lowest gear in the automatic transmission is engaged by means of final control signals of a regulating or control unit. The process is then continued to the next step 34 of the method.

If the result of the query in the step 32 is that the setting of the automatic gearbox is in the drive position, the yes branch "Y" is immediately—possibly after engaging the lowest gear—advanced to the step 34, in which the drive motor that is implemented as a combustion engine in the vehicle is turned off. In combination with the lowest gear, which is set in the automatic transmission, a high engine drag torque is acting, by means of which the vehicle is additionally decelerated.

In the following step 35 of the method, the query is carried out as to whether the vehicle is already at a standstill. If this is still not the case, the no branch is then returned to the start of the query according to step 35 and the query is run through again at cyclical intervals.

After the vehicle is at a standstill, the yes branch is then advanced to the step 36, in which a query is carried out as to whether the desired target clamping force has been achieved in the electromechanical braking mechanism. This ensures that for different parking conditions, possibly even for parking the vehicle on a slope, a sufficiently high clamping force is acting in the electromechanical braking mechanism that holds the vehicle permanently. If the query in the step 36 indicates that the target clamping force has not yet been reached, the no branch is again returned to the start of the query and the query is run through again at cyclical intervals. In the meantime, an increasing clamping force is built up in the electromechanical braking mechanism.

If the query in the step 36 reveals that the target clamping force has been achieved, the yes branch is then advanced to the step 37, with which the method is terminated. A sufficiently high clamping force is acting in the electromechanical braking mechanism and the vehicle is at a standstill.

Figure 4:
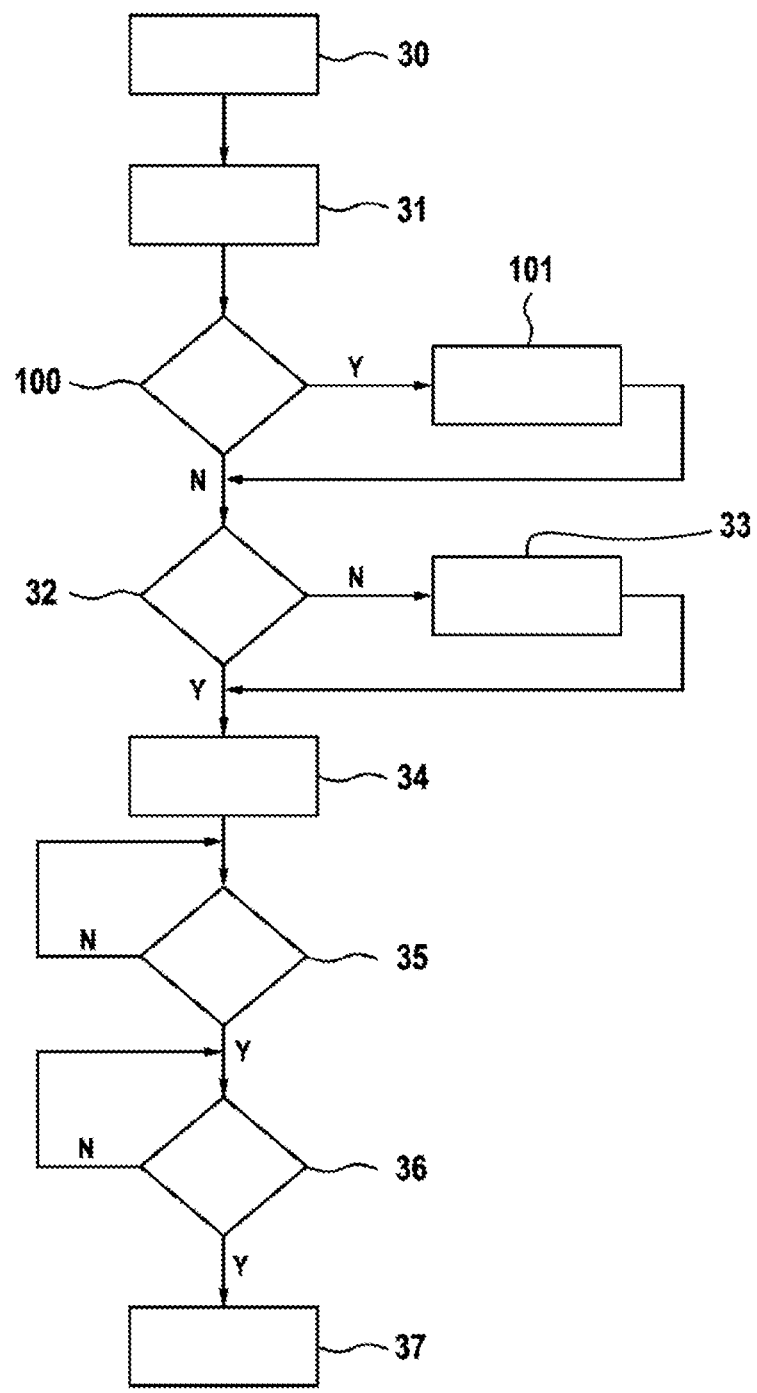
FIG. 4 shows a further process schema for decelerating a vehicle in the parking mode, shown for an all-wheel drive vehicle.

The process of the method according to FIG. 3 concerns a vehicle with a combustion engine drive and a driven vehicle axle. In FIG. 4, by contrast, a process of the method for an emergency stop in the automatic parking mode of a vehicle with a combustion engine, an automatic transmission and an all-wheel drive is represented for the case in which the hydraulic vehicle brake fails. The same steps of the method as in FIG. 3 are provided with the same reference characters.

Similarly to FIG. 3, in FIG. 4 the failure of the hydraulic vehicle brake is also detected in the step 30 and the emergency stop is initiated in the step 31 by first starting the electromechanical braking mechanism.

In the subsequent step 100, a query is carried out as to whether the central differential between the front axle and the rear axle is unlocked. If this is the case, the yes branch is then advanced to the step 101 and the central differential is locked, whereupon the process is advanced to the next step 32. If on the other hand the query in the step 100 reveals that the central differential is locked, the locking position already exists and the no branch is then advanced directly to the next query 32.

The next steps of the method 32 through 37 correspond to those of FIG. 3. In the step 32, the gearbox setting is queried, and the lowest gear in the gearbox is engaged in the step 33 if necessary. In the step 34, the combustion engine is turned off, and in the step 35 the query is carried out as to whether the vehicle is stationary. In the step 36 a query is carried out as to whether the target clamping force in the electromechanical braking mechanism has already been achieved. In the step 37, the method is terminated after the target clamping force has been set and the vehicle is at a standstill.

Figure 5:
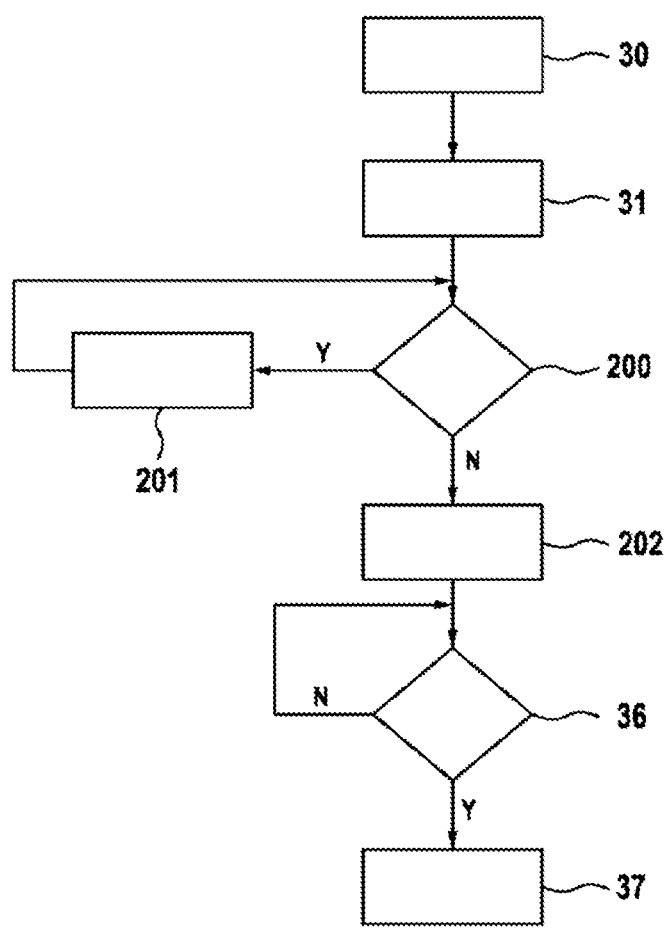
FIG. 5 shows a further process schema for decelerating a vehicle in the parking mode, shown for a vehicle with an electromotive drive.

In FIG. 5, a process of the method for decelerating a vehicle in the parking mode in the event of a failure of the hydraulic vehicle brake for a vehicle with an electromotive drive is represented. The same steps of the method as in FIGS. 3 and 4 are also provided with the same reference characters in FIG. 5.

In the step 30, the failure of the hydraulic vehicle brake is detected, whereupon in the step 31 the emergency stop is initiated and the electromechanical braking mechanism is started. In the subsequent step 200, a query is carried out as to whether the vehicle is moving forwards or moving rearwards. If the vehicle is moving, the yes branch then branches to the step 201 and the electric drive motor is accelerated opposite to the direction of motion of the vehicle. As a result, a torque that decelerates the vehicle is produced by means of the electric drive motor. Following the step 201, the process again returns to the query according to step 200 and checks again at cyclical intervals whether the vehicle is still moving.

If the query in the step 200 reveals that the vehicle is at a standstill, the no branch is then advanced to the step 202 and the actuation of the electric drive motor is adjusted to prevent acceleration of the vehicle from a standstill in the opposite direction. If, however, the vehicle is standing on an upslope and no adequate clamping force is available by means of the electromechanical braking mechanism, the electric drive motor is actuated in the step 202 in such a manner that a force that compensates the downhill force is produced in the drive motor.

The steps 36 and 37 correspond to those from FIGS. 3 and 4. In the step 36, a query is carried out as to whether the target clamping force has been achieved in the electromechanical braking mechanism. If this is the case, the electric drive motor is turned off in the step 37 and the method is terminated.

The invention claimed is:

1. A method for decelerating a vehicle including a brake system, the brake system including a hydraulic vehicle brake and an electromechanical braking mechanism with an electric brake motor, the method comprising:
   actuating the electric brake motor of the electromechanical braking mechanism to produce a braking force against a brake disc in an event of a failure of the hydraulic vehicle brake; and
   operating the drive train of the vehicle in a manner that produces a decelerating torque in the drive train in the event of the failure of the hydraulic vehicle brake,
   wherein the decelerating torque produced by the drive train is maintained beyond a time at which the braking force is made available in the electromechanical braking mechanism.

2. The method as claimed in claim 1, further comprising:
   actuating the electric brake motor in the event of the failure of the hydraulic vehicle brake only when the vehicle is moving below a speed limit; and
   producing the decelerating torque in the drive train of the vehicle in the event of the failure of the hydraulic vehicle brake only when the vehicle is moving below the speed limit.

3. The method as claimed in claim 1, wherein the method is carried out in a parking mode.

4. The method as claimed in claim 1, further comprising:
   following the failure of the hydraulic vehicle brake firstly actuating the electromechanical braking mechanism and secondly adjusting the drive train such that the decelerating torque is produced.

5. The method as claimed in claim 1, further comprising:
   engaging the lowest possible gear in an automatic transmission in the vehicle.

6. The method as claimed in claim 1, further comprising: turning off a combustion engine in the drive train to produce the decelerating torque.

7. The method as claimed in claim 1, further comprising: switching an electric motor in the drive train to a generator mode to produce the decelerating torque.

8. The method as claimed in claim 1, further comprising: accelerating an electric motor in the drive train against a direction of travel to produce the decelerating torque.

9. The method as claimed in claim 1, further comprising: locking a central differential between a front axle and a rear axle of an all-wheel drive vehicle to produce the decelerating torque.

10. The method as claimed in claim 1, wherein the electric brake motor is controlled by a regulating unit or a control unit.

11. A vehicle comprising:
a brake system including a hydraulic vehicle brake and an electromechanical braking mechanism having an electric brake motor;
a drive train; and
a regulating unit configured to carry out a method for decelerating the vehicle, the method including
actuating the electric brake motor of the electromechanical braking mechanism to produce a braking force against a brake disc in an event of a failure of the hydraulic vehicle brake, and
operating the drive train of the vehicle in a manner that produces a decelerating torque in the drive train in the event of the failure of the hydraulic vehicle brake,
wherein the decelerating torque produced by the drive train is maintained beyond a time at which the braking force is made available in the electromechanical braking mechanism.

12. A method for decelerating a vehicle including a brake system, the brake system including a hydraulic vehicle brake and an electromechanical braking mechanism with an electric brake motor, the method comprising:
actuating the electric brake motor of the electromechanical braking mechanism to produce a braking force against a brake disc in an event of a failure of the hydraulic vehicle brake;
operating the drive train of the vehicle in a manner that produces a decelerating torque in the drive train in the event of the failure of the hydraulic vehicle brake; and
engaging the lowest possible gear in an automatic transmission in the vehicle.

* * * * *